United States Patent
Chen et al.

(10) Patent No.: US 11,168,171 B2
(45) Date of Patent: Nov. 9, 2021

(54) ELASTOMER, METHOD FOR PREPARATION THEREOF, AND USE THEREOF

(71) Applicant: CHINESE ACADEMY OF SCIENCES, NINGBO INSTITUTE OF MATERIAL TECHNOLOGY & ENGINEERING, Zhejiang (CN)

(72) Inventors: Jing Chen, Zhejiang (CN); Haining Na, Zhejiang (CN); Jin Zhu, Zhejiang (CN); Suping Lyu, Mounds View, MN (US); XiangJi Chen, Fridley, MN (US)

(73) Assignee: Medtronic, Inc., Minneapolis, MN (US)

( * ) Notice: Subject to any disclaimer, the term of this patent is extended or adjusted under 35 U.S.C. 154(b) by 139 days.

(21) Appl. No.: 16/091,045

(22) PCT Filed: Mar. 2, 2017

(86) PCT No.: PCT/CN2017/075376
§ 371 (c)(1),
(2) Date: Oct. 3, 2018

(87) PCT Pub. No.: WO2018/157341
PCT Pub. Date: Sep. 7, 2018

(65) Prior Publication Data
US 2019/0112411 A1    Apr. 18, 2019

(51) Int. Cl.
C08G 18/62    (2006.01)
C08G 18/12    (2006.01)
(Continued)

(52) U.S. Cl.
CPC ......... C08G 18/12 (2013.01); C08G 18/0852 (2013.01); C08G 18/0895 (2013.01);
(Continued)

(58) Field of Classification Search
CPC ............ C08G 18/7671; C08G 18/6208; C08G 18/3228; C08G 18/3206; C08G 18/3234;
(Continued)

(56) References Cited

U.S. PATENT DOCUMENTS 5,040,544 A    8/1991    Lessar et al.
5,589,563 A *  12/1996   Ward ...................... A61L 27/18
                                              210/500.21
(Continued)

FOREIGN PATENT DOCUMENTS

CA    2121660    * 11/1994    ............ C08G 18/40
CN    1191550 A    8/1998
(Continued)

OTHER PUBLICATIONS

Michael Szycher. Jul. 13, 2012, Structure-Property Relations in Polyurethanes from: Szycher's Handbook of Polyurethanes CRC Press Accessed on: Apr. 10, 2020 https://www.routledgehandbooks.com/doi/10.1201/b12343-4. pp. 37-86.*
(Continued)

Primary Examiner — Michael L Leonard
(74) Attorney, Agent, or Firm — Mueting Raasch Group

(57) ABSTRACT

Disclosed is a segmented thermoplastic elastomer that can be a polyurethane, polyurea, or polyurethane-urea comprising soft segments and hard segments, wherein the soft segments are made of polyolefin diols or polyolefin diamine that may have 0 to 1000 carbon atoms in the main chain, wherein each carbon atom in the main chain may have 0 to 2 side chains and each side chain may have 0 to 30 carbon atoms, the hard segment is made of a diisocyante and a chain extender, the hard segments make up 10-60% of the elastomer and the soft segments make up the rest, the number-average molecular weight of the elastomer is $5\times10^3$-$1000\times10^3$ g/mol, the ultimate elongation of the elastomer is 100-
(Continued)

1000%, the Young's modulus is 1 to 3,000 MPa, and the ultimate tensile strength is 10-100 MPa. Also disclosed are a method for preparing the segmented thermoplastic elastomer and use of segmented thermoplastic elastomer.

17 Claims, 1 Drawing Sheet

(51) Int. Cl.

| | | |
|---|---|---|
| C08G 18/10 | (2006.01) | |
| C08G 18/76 | (2006.01) | |
| C08G 18/08 | (2006.01) | |
| C08G 18/48 | (2006.01) | |
| C08G 18/73 | (2006.01) | |
| C08G 18/75 | (2006.01) | |
| B01J 19/12 | (2006.01) | |

(52) U.S. Cl.
CPC ......... *C08G 18/10* (2013.01); *C08G 18/4825* (2013.01); *C08G 18/6208* (2013.01); *C08G 18/6212* (2013.01); *C08G 18/6283* (2013.01); *C08G 18/73* (2013.01); *C08G 18/751* (2013.01); *C08G 18/758* (2013.01); *C08G 18/7621* (2013.01); *C08G 18/7657* (2013.01); *C08G 18/7671* (2013.01); *B01J 19/124* (2013.01); *B01J 19/126* (2013.01)

(58) Field of Classification Search
CPC .. C08G 18/3271; C08G 18/328; B01J 19/124; B01J 19/126
See application file for complete search history.

(56) References Cited

U.S. PATENT DOCUMENTS

| | | | |
|---|---|---|---|
| 5,864,001 A | 1/1999 | Masse et al. | |
| 6,537,661 B1* | 3/2003 | Djiauw | C08G 18/62 |
| | | | 528/85 |
| 6,915,168 B1 | 7/2005 | Benz et al. | |
| 9,574,043 B2 | 2/2017 | Faust et al. | |
| 9,926,399 B2 | 3/2018 | Faust et al. | |
| 2010/0179298 A1* | 7/2010 | Faust et al. | C08G 18/67 |
| | | | 528/75 |
| 2010/0241208 A1 | 9/2010 | Pinchuk | |
| 2011/0152989 A1 | 6/2011 | Tan | |
| 2014/0121742 A1 | 5/2014 | Boser et al. | |
| 2014/0144580 A1* | 5/2014 | Desai et al. | A61L 31/06 |
| | | | 156/244.17 |
| 2014/0171543 A1 | 6/2014 | Chang et al. | |
| 2016/0113710 A1 | 4/2016 | Ogle et al. | |

FOREIGN PATENT DOCUMENTS

| | | |
|---|---|---|
| CN | 1234042 A | 11/1999 |
| CN | 1587294 A | 3/2005 |
| CN | 101538358 A | 9/2009 |
| CN | 102365308 B | 2/2012 |
| CN | 104520345 A | 4/2015 |
| CN | 105111404 A | 12/2015 |
| CN | 105315424 A | 2/2016 |
| EP | 0833854 | 4/1998 |
| WO | 97/00901 | 1/1997 |
| WO | 2010/081132 | 7/2010 |
| WO | 2016/098073 | 6/2016 |

OTHER PUBLICATIONS

International Search Report and Written Opinion for International Patent Application No. PCT/CN2017/075376, dated Dec. 1, 2017, 13 pages.
International Search Report and Written Opinion for International Patent Application No. PCT/CN2017/075377, dated Nov. 15, 2017, 13 pages.
Coury et al., "Biomedical Uses of Polyurethanes," Advances in Urethane Science and Technology, 1984; 9:130-168, edited by Kurt C. Frisch and Daniel Klempner, Technomic Publishing Co., Lancaster, Pa.
Office Action dated Mar. 18, 2020 from U.S. Appl. No. 16/091,040, 11 pages.
Office action dated Jul. 28, 2020 from U.S. Appl. No. 16/091,040, 13 pages.
European Search Report from EP Application No. 17898707.9 dated Oct. 28, 2020, 9 pages.
Translation of Office Action from CN Application No. 201780087084.9 dated Feb. 3, 2021, 21 pages.
Office Action from CN Application No. 201780087084.9 dated Feb. 3, 2021, 15 pages.

* cited by examiner

ELASTOMER, METHOD FOR PREPARATION THEREOF, AND USE THEREOF

This application is the § 371 U.S. National Stage of International Application No. PCT/CN2017/075376, filed 2 Mar. 2017, the disclosure of which is incorporated by reference herein in its entirety.

TECHNICAL FIELD

The present invention falls within the field of macromolecular material, relating to a polyurethane comprising polyolefin soft segments. More particularly, the present invention relates to a polyurethane, a method for preparation thereof, and use thereof.

BACKGROUND ART

A polyurethane is a family of polymeric materials whose chains have soft and hard segments. Because of this unique structure, polyurethane materials have many excellent properties, for example, resistance to low temperature, abrasion resistance, and high stability in biological environment, thus widely used in airspace products, medical devices, coatings, textile and leather. Currently, polyurethane materials used in medical devices often have the following structures: the soft segments are formed by oligomer polyols such as polytetramethyleneoxide (PTMO), polydimethylsiloxane (PDMS), or aliphatic polycarbonate, while the hard segments are formed by diisocyanate such as 4,4'-diphenylmethane diisocyanate (MDI) or hydrogenated MDI (HMDI), and chain extender such as 1,4-butanediol (BDO). However, during long term use, polyether or polycarbonate polyurethanes may chemically degrade through oxidation, hydrolysis, or enzymatic reactions which could result in material failure, or, under certain conditions, even device failure. For example, polyether polyurethane materials, when used in long term implants, can be oxidized. The oxidation caused by the inflammatory reactions often occurs at the device surface contacting the tissues. It is known as environmental stress cracking. The oxidation reaction that occurs at the device surface contacting certain metallic surface (e.g. cobalt and its alloys) is known as metal ion induced oxidization.

Generally, ether bonds are susceptible to oxidation degradation. Unfortunately, oxidative chemicals are present in the patients' biology. Therefore, the key for solving such a problem is to develop a polyurethane material which is composed of soft segments that are more resistant to oxidation reactions than polyether. A number of polyurethanes with new soft segments have been developed in the past, for example, polycarbonate polyurethane (Carbothane™ by Lubrizol, Bionate™ by DSM, etc.), PDMS polyurethane (ElastEon™ by Biomerics, Pursil™ by DSM, etc.), etc. Those new materials have demonstrated improved resistance to oxidation degradation. However, there are concerns of hydrolysis degradation with them.

Recently, a polyurethane material which is made of polyisobutylene soft segment has shown excellent oxidation and hydrolytic degradation resistance. However, the synthesis of this material requires complicated processes. Production of the material at commercial scale with comparable cost remains an issue. Polyethylene diol has been proposed in the past (Reference 1: M. D. Benz, K. Bonnema, E. Didomenico, C. Hobot, D. Miller, "Medical devices containing segmented polyurethane biomaterials", U.S. Pat. No. 6,915, 168). It was assumed that polyurethane made of polyethylene segments would have good resistance to oxidation and hydrolytic reactions. Similar to polyisobutylene polyurethane, synthesis process of polyethylene polyurethane remains a technical challenge, which continues to delay the commercialization of the material.

Therefore, there still is a need to develop an effective method for producing polyolefin diols to make polyurethane materials.

SUMMARY OF THE INVENTION

The present invention is an effective method for preparing polyolefin polyurethane. The method consists of two parts. The first part is making polyolefin diols by polymerizing dienes followed by hydrogenation. A second part is making polyurethane materials by using microwave heating. The polyolefin polyurethane made in the present way is expected to have the excellent properties for long term biomedical implant applications.

Disclosure of the Invention

The objects of the present invention can be achieved by the following:

{1} A polyurethane, polyurea, or polyurethane-urea elastomeric composition may be defined as a reaction production of:
  1) macrodiols or macrodiamines including hydrogenated polyolefin diols, hydrogenate polyolefin diamines, or a mixture of hydrogenated polyolefin diols, hydrogenated polyolefin diamines, polyether diols, and/or polycarbonate diols, wherein the polyolefin diols or polyolefin diamine that may have 0 to 1000 carbon atoms in the main chain, wherein each carbon atom in the main chain may have 0 to 2 side chains and each side chain may have 0 to 30 carbon atoms,
  2) a diisocyanate, and
  3) a chain extender {2} The polyurethane, polyurea or polyurethane-urea elastomeric composition according to {1}, characterized in that the number-average molecular weight of the elastomeric composition is $5\times10^3$-$1000\times10^3$ g/mol; the ultimate elongation of the elastomeric composition is 100-1000%; the flexural modulus is 1 to 3,000 MPa; and the ultimate tensile strength of the elastomeric composition is 10-100 MPa.

{3} The polyurethane, polyurea or polyurethane-urea elastomeric composition according to {1}, characterized in that the macrodiol is preferably selected from polybutadiene diol, polyisoprene diol, polybutylene diol, polyethylene diol, polypropylene diol, poly(ethylene-propylene) copolymer diol, polyisobutylene diol, and mixtures thereof;

the diisocyanate is selected from toluene-2,4-diisocyanate (TDI), its isomer or a mixture thereof; 4,4'-diphenylmethane diisocyanate (MDI), hexamethylene diisocyanate, isophorone diisocyanate, methylene bis(cyclohexyl) diisocyanate (HMDI), trans-cyclohexane,1,4-diisocyante (CHDI), p-phenyl diisocyanate, lysine diisocyanate, p-phenyl dimethylene diisocyanate, 1,5-cyclopentane diisocyanate, p-tetramethyl ditoluene diisocyanate, m-tetramethyl ditoluene diisocyanate, and mixtures thereof; wherein MDI is particularly preferred; and the chain extender is selected from ethylene glycol, 1,3-propylenediol, 1,4-butanediol, 1,4-hexanediol, 1,4-cyclohexanediol, 1,6-hexanediol, 1,8-octanediol, 1,9-nonanediol, 1,10-decanediol, ethylenediamine, propylenediamine, butylenediamine, hexanediamine, cyclohexanediamine, and mixture thereof; wherein 1,4-butanediol is preferred.

{4} The polyurethane, polyurea or polyurethane-urea elastomeric composition according to {3}, characterized in that the macrodiol is hydrogenated polybutadiene diol, or hydrogenated polyisoprene diol.

{5} A method for preparing a polyurethane, polyurea or polyurethane-urea elastomeric composition, comprising the following steps:

(i) preparing diols that have unsaturated bonds followed by hydrogenating the diols to obtain hydrogenated diols, wherein the diols have the following structure:

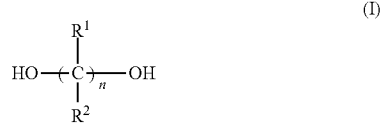 (I)

wherein n is an integer of 1-1000; and, $R^1$ and $R^2$ are independently H, $C_{1-30}$ alkyl, $C_{3-30}$ cycloalkyl or $C_{2-30}$ alkenyl;

(ii) conducting pre-polymerization of the hydrogenated diols obtained in step (i) with a diisocyanate and a polymerization catalyst by using microwave radiation, to obtain a polyurethane prepolymer; and (iii) adding a chain extender into the polyurethane prepolymer, and continuing a polymerization by using microwave radiation, to obtain the polyurethane.

{6} The method according to {5}, characterized in that in step (i), adding the diols and a noble metal hydrogenating catalyst into a hydrogenating reactor to hydrogenate the diols.

{7} The method according to {6}, characterized in that the reaction temperature is 0-200° C., the reaction pressure is 0.1-100 MPa, and the reaction time is 1-24 h; and, the noble metal hydrogenating catalyst is one of the Pt group metals.

{8} The method according to {5}, characterized in that in step (ii), the diisocyanate is selected from toluene-2,4-diisocyanate (TDI), its isomer or a mixture thereof; 4,4'-diphenylmethane diisocyanate (MDI), hexamethylene diisocyanate, isophorone diisocyanate, methylene bis(cyclohexyl) diisocyante (HMDI), trans-cyclohexane,1,4-diisocyante (CHDI), p-phenyl diisocyanate, lysine diisocyanate, p-phenyl dimethylene diisocyanate, 1,5-cyclopentane diisocyanate, p-tetramethyl ditoluene diisocyanate, m-tetramethyl ditoluene diisocyanate, and mixtures thereof; the polymerization catalyst is selected from the group consisting of triethylene diamine, dibutyldilaurate tin, stannous octoate, and mixtures thereof; and
the pre-polymerization temperature is 50-200° C., and the pre-polymerization time is 1-5 h; and the microwave radiation power is adjusted such that the temperature is maintained within the intended range, for example, applying 300-600 W for 50 mL to 800 mL of reactant mixture.

{9} The method according to {8}, characterized in that the pre-polymerization temperature is from 65 to 95° C.

{10} The method according to {5}, characterized in that in step (iii), the chain extender is selected from ethylene glycol, 1,3-propylenediol, 1,4-butanediol, 1,4-hexanediol, 1,4-cyclohexanediol, 1,6-hexanediol, 1,8-octanediol, 1,9-nonanediol, 1,10-decanediol, p-diphenyl ethylene diol, colophony dimethol, ethylenediamine, propylenediamine, butylenediamine, hexanediamine, cyclohexanediamine, and mixture thereof; and the polymerization temperature is 50-250° C., and the polymerization time is 2-3 h; and the microwave radiation power is adjusted such that the temperature of the reaction mixture is maintained within the intended range, for example, applying 300-600 W for 50 mL to 800 mL of reactant mixture.

{11} The method according to {10}, characterized in that the pre-polymerization temperature is from 65 to 95° C.

{12} The method according to {5}, characterized in that the steps (i)-(iii) are conducted in the presence of a solvent, wherein the solvent is selected from toluene, xylene, tetrahydrofuran,trichloromethane, N,N-dimethyl formamid, ethyl acetate, N,N-dimethylacetamide, dimethyl sulfoxide and mixtures thereof.

{13} An alternative method to make the same polyurethane, polyurea or polyurethane-urea elastomeric composition includes the following steps: (1) making unsaturated diol by polymerizing dienes, (2) making polyurethane, and (3) hydrogenating the polymer into saturated polyurethane.

{14} The use of the polyurethane according to any one of {1}-{4} in a medical device, coating, fiber, adhesive or foam materials.

Advantageous Effect

The present invention provides a production method that provides a feasible path to make saturated polyethylene diol and other polyolefin diols. It is simple and highly efficient. Specifically, it can be realized with lower equipment cost, shorter reaction time, higher yield, fewer byproducts, and lower energy consumption than that with traditional methods. It is suitable for continuous production at large scale.

Products made with this method can be used for medical devices, coatings, fiber, adhesives or foam materials.

BEST MODE FOR CARRYING OUT THE INVENTION

Definition of Terminology

Figure 1:
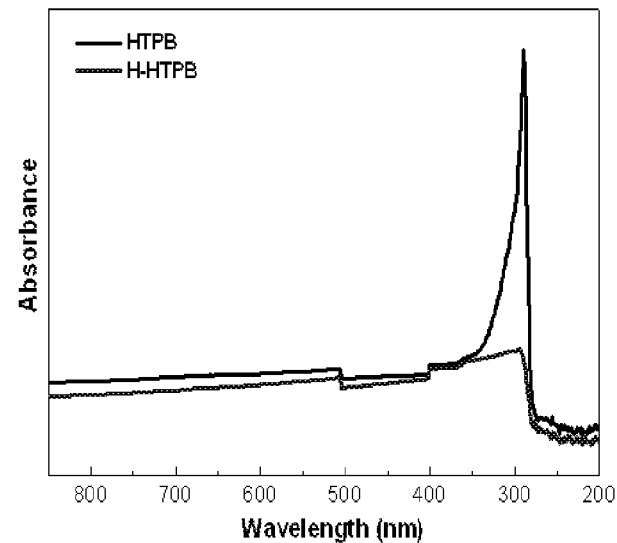
FIG. 1 shows UV absorbance spectrum of polybutylene glycol in Example 1, before hydrogenating vs. after hydrogenating.

In the present application, the terms are defined as follows:

Polymerization is a chemical reaction between many monomers of one or more types. The reaction results in formation of a long chain molecule. The reactive groups of the monomers are chemically linked together and become different groups. For example, a hydroxyl of one monomer and an isocyanate of another monomer can react and form a urethane group. The urethane groups present in the polymer chain and function as linkages.

Diol is an organic compound that has two hydroxyl groups that can react with isocyanate groups of other compounds.

Diisocyanate is an organic compound that has two isocyanate groups that can react with hydroxyl groups to form urethane groups.

Chain extender is a compound that has a molecular weight of less than 200 D and two hydroxyl groups that can react with isocyanates. Chain extender can also be diamine or compound with amine at one end and hydroxyl group at the other end, such as 4-amino-1-butanol.

Catalyst is a compound that can accelerate reactions, but is not a part of reaction products.

Unsaturated soft segment diol is a soft segment diol containing C=C double bonds or other unsaturated hydrocarbon bonds.

Hydrogenation is a reaction to convert unsaturated hydrocarbon groups into saturated groups by adding hydrogen atoms, for example converting C=C into C—C. The reaction usually needs hydrogen gas and catalysts.

Polyurethane prepolymer is a polymer that has a molecular weight of 50 D to 10,000 D and has two isocyanate groups at the ends of each molecule that can react with chain extender to form urethane groups.

Polyurethane is a polymer that is formed through reactions between diol and diisocyanate compounds. Urethane groups formed are the linkages between the monomers.

Chain branch is a chemical group chemically linked to the main chain structure as a side group. A polymer chain can have one or more than one chain branch. Chain braches can be same or different. Some chain branch examples as methyl, ethyl, propyl, butyl, isobutyl, etc.

Microwave radiation reactor is a chemical reactor in which the reaction can proceed under microwave radiation. A typical microwave radiation reactor has non-contact infrared temperature sensors that can be used to monitor reaction mixture temperature and allow the temperature to be controlled on real-time base.

In one embodiment, the polyurethane cited above can be made in the following way in two steps.

In the first step, making a diol having the following structure:

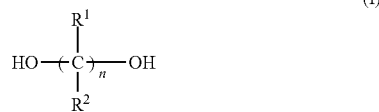

(I)

wherein n is an integer of 1-1000; $R^1$ and $R^2$ are independently H, $C_{1-30}$ alkyl, $C_{3-30}$ cycloalkyl or $C_{2-30}$ alkenyl.

In order to achieve the structure in the first step, a proper diene monomer or a group of proper diene monomers are selected. The diene monomers polymerize alone or copolymerize with other alkene monomers using hydrogen peroxide as catalyst for both cases. The dienes include, but not limited to, butadiene, isoprene, etc. The alkene monomers include, but not limited to, ethylene, propylene, butylene, isobutylene and combination thereof. The molecular weight of polydiene can be controlled by adjusting the ratio of the total double bonds and hydrogen peroxide. The polydienes can also be made by anionic polymerization, living free radical polymerization, and/or other polymerization reactions followed by terminating the two chain ends with hydroxyl groups to form diol structures.

In the second step, the structure (I) made in the first step is hydrogenated into the following saturated diols (II):

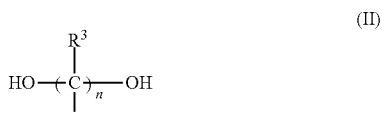

(II)

wherein n is an integer of 1-1000; $R^3$ and $R^4$ are independently H, $C_{1-30}$ alkyl, or $C_{3-30}$ cycloalkyl.

The diols according to the structure (II) is hydrogenated polyethylene diol, hydrogenated polypropylene diol, hydrogenated polybutylene diol, hydrogenated polybutadiene diol, hydrogenated polypentylene diol, hydrogenated poly (4-methyl-1-pentene) diol, hydrogenated polyhexene diol, hydrogenated poly(ethylene-propylene) copolymer diol, or hydrogenated polyisobutylene diol.

During preparing a polyurethane, water and/or other impurities are removed before conducting hydrogenation to avoid poisoning the hydrogenation catalysts. An expert in the field should know methods of removing impurities. One method can be heating the mixtures while applying vacuum for proper duration.

In the first aspect, the present invention provides a polyurethane, polyurea, or polyurethane-urea elastomer being made of a soft segment diols or diamines including, but not limited to, hydrogenated polyolefin diols, hydrogenated polyolefin diamines, or a mixture of hydrogenated polyolefin diols, hydrogenated polyolefin diamines, polyether diols, and/or polycarbonate diols. The polyolefin diols or polyolefin diamine that may have 0 to 1000 carbon atoms in the main chain, wherein each carbon atom in the main chain may have 0 to 2 side chains and each side chain can have 0 to 30 carbon atoms.

In this invention, the number-average molecular weight of elastomer is $5\times10^3$-$1,000\times10^3$ g/mol, preferably $100\times10^3$-$600\times10^3$ g/mol; the ultimate elongation of elastomer is 100-1000%; Young's modulus is 1 to 3,000 MPa; and the ultimate tensile strength of the elastomer is 10-100 MPa.

In the second aspect, the present invention provides a method for preparing the above polyurethane, comprising the following steps:

(i) hydrogenating diol to obtain a hydrogenated diol;
(ii) conducting pre-polymerization of the hydrogenated diol obtained in step (i) with a diisocyanate and a polymerization catalyst by using microwave radiation, to obtain a polyurethane prepolymer; and
(iii) adding a chain extender into the polyurethane prepolymer, and continuing a polymerization by using microwave radiation, to obtain the polyurethane.

In this invention, in step (i), adding diols and a solvent into a reactor, for example, a hydrogenating reactor; after diol is dissolved, adding a noble metal hydrogenating catalyst and hydrogen gas into the reactor; controlling the temperature and pressure to be within pre-planned ranges and letting the reaction continue until completion; and, separating the hydrogenating diols, purifying, and drying them.

In this invention, in step (i), the volume of the hydrogenating reactor is 1-3 L, the reaction temperature is 0-200° C., preferably 50-150° C., the reaction pressure is 0.1-100 MPa, and the reaction time is 1-24 h; and, the noble metal hydrogenating catalyst is one of the Pt group metals (i.e. Ru, Rh, Pd, Os, Ir and Pt) carrier catalysts.

In this invention, in step (ii), before conducting pre-polymerization, heating and dehydrating the hydrogenated soft segment obtained in step (i) in vacuum, wherein the temperature of heating and dehydrating is 80-120° C., and the time of heating and dehydrating is 1-6 h.

In this invention, in step (ii), the diisocyanate is selected from toluene-2,4-diisocyanate (TDI), its isomer or a mixture thereof; 4,4'-diphenylmethane diisocyanate (MDI), hexamethylene diisocyanate, isophorone diisocyanate, methylene bis(cyclohexyl) diisocyante (HMDI), trans-cyclohexane,1, 4-diisocyante (CHDI), p-phenyl diisocyanate, lysine diisocyanate, p-phenyl dimethylene diisocyanate, 1,5-cyclopentane diisocyanate, p-tetramethyl ditoluene diisocyanate, m-tetramethyl ditoluene diisocyanate, and mixtures thereof.

In this invention, in step (ii), the polymerization catalyst is selected from the group consisting of triethylene diamine, dibutyldilaurate tin, stannous octoate, and mixtures thereof.

In this invention, in step (ii), the pre-polymerization temperature is 50-200° C., preferably from 65 to 95° C., and the pre-polymerization time is 1-5 h.

In this invention, in step (ii), the microwave radiation power is 100-800 W for 10 mL to 2 L of reactant mixture.

In this invention, in step (iii), the chain extender is selected from ethylene glycol, 1,3-propylenediol, 1,4-butanediol, 1,4-hexanediol, 1,4-cyclohexanediol, 1,6-hexanediol, 1,8-octanediol, 1,9-nonanediol, 1,10-decanediol, p-diphenyl ethylene diol, colophony dimethol, ethylenediamine, propylenediamine, butylenediamine, hexanediamine, cyclohexanediamine, and mixture thereof;

In this invention, in step (iii), the polymerization temperature is 50-250° C., and the polymerization time is 1-5 h, preferably 2-3 h.

In this invention, the steps (i)-(iii) are conducted in the presence of a solvent, wherein the solvent is selected from the group consisting of toluene, xylene, tetrahydrofuran, trichloromethane, N,N-dimethyl formamid, ethyl acetate, N,N-dimethylacetamide, dimethyl sulfoxide and mixtures thereof.

EXAMPLES

Examples are given below in order to specifically describe the present invention; however, the present invention is not limited to the examples that are described below. In the following examples, measurements or quantity ratios are based on weight in all instances.

Example 1: Preparing Hydrogenated Diols 50 g of polybutadiene diol and 600 mL THF were added into a hydrogenating kettle; after polybutadiene diol was dissolved, 12 g of Pt hydrogenating catalyst and hydrogen gas were added into the hydrogenating kettle; the temperature was controlled to be 60° C. and pressure was controlled to be 2 MPa and the reaction continued for 20 hours until completion; and, the obtained hydrogenated diols were separated, purified, and dried.

Example 2

Procedure:

30 mL toluene and 3.7 g hydrogenated polybutadiene diol (H-HTPB) were added in a 100 mL glass reactor. The mixture was stirred until the H-HTPB was dissolved in the toluene. Then 1.5 g 4,4'-diphenyl methane diisocyanate was added followed by adding 40 μL dibutyldilaurate tin catalyst. Microwave radiation (400 W) was then used to heat the reaction mixture to maintain its temperature at 65° C. while it was stirred. After 2 hours of reaction, 0.36 g of chain extender BDO (calculated according to the amount of titrated isocyanate such that the total molar of OH is equal to that of isocyanate); and then the temperature was raised to 80° C. by increasing microwave power to 500 W. Let the reaction continue for 2 more hours. When the isocyanate completely reacted based on FI-IR test, the reaction was stopped. The reaction solution was poured into menthol to precipitate the polymer product. The mixture was placed in a refrigerator for 24 hours. The solid polymer product was harvested by centrifuging mixture. The product was dried in vacuum oven for 24 hours.

Result:

The yield of the reaction was 75%. The number-average and weight-average molecular weights measured with Gel Permeation Chromatography (GPC) were $Mn=30\times10^3$ g/mol, and $Mw=50\times10^3$ g/mol.

FIG. 1 shows UV absorbance spectrum of polybutylene glycol before hydrogenating vs. after hydrogenating. The characteristic absorbance peak of double bond of HTPB at 288 nm disappeared after hydrogenating, indicating that all of the double bond in HTPB were hydrogenated.

Figure 2:
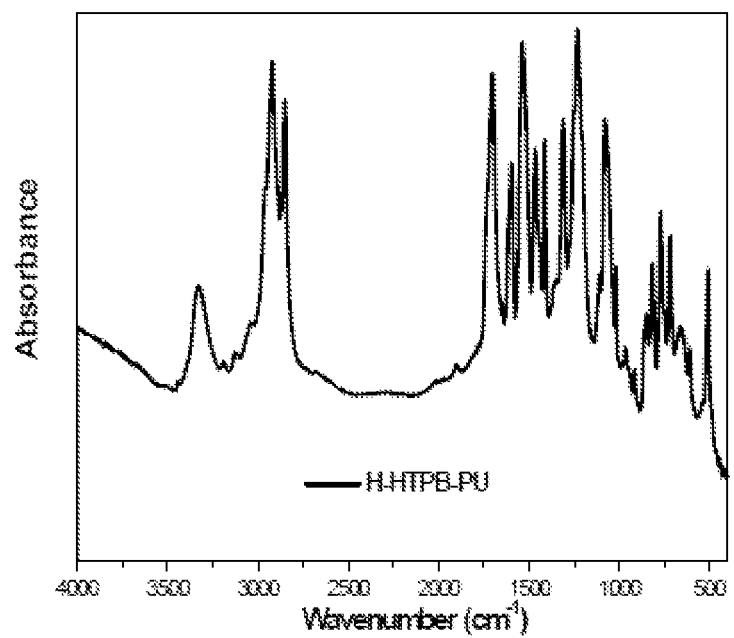
FIG. 2 shows IR spectrum of the obtained polyurethane in Example 1.

FIG. 2 shows IR spectrum of the resulting polyurethane. The characteristic peak of isocyanate group —NCO at 2,270 cm$^{-1}$ disappeared, indicating that all of the residual isocyanate groups had been reacted in the last step. The peaks at 3,327 cm$^{-1}$ and 1,538 cm$^{-1}$ were assigned to —NH— of the urethane group and the peak at 1,710 cm$^{-1}$ was assigned to —C=O of urethane group. These two peaks suggest the formation of urethane.

Example 3

Procedure:

30 mL toluene was added in a 100 mL glass reactor and heated to 65° C. 3.7 g hydrogenated polybutadiene diol (H-HTPB) was added in the reactor. The mixture was stirred until the H-HTPB was dissolved in the toluene. Then 1.5 g 4,4'-diphenyl methane diisocyanate was added followed by adding 40 μL dibutyldilaurate tin catalyst. The reaction mixture was heated with a regular heater to maintain its temperature at 65° C. while it was stirred. After 5 hours of reaction, 0.36 g of chain extender BDO (calculated according to the amount of titrated isocyanate such that the total molar of OH is equal to that of isocyanate); and then the temperature was raised to 80° C. by increasing heating power. Let the reaction continue for 5 more hours. When the isocyanate completely reacted based on FI-IR test, the reaction was stopped. The reaction solution was poured into menthol to precipitate the polymer product. The mixture was placed in a refrigerator for 24 hours. The solid polymer product was harvested by centrifuging mixture. The product was dried in vacuum oven for 24 hours.

Result:

The yield of the reaction was 70%, and the number-average and weight-average molecular weights measured by Gel Permeation Chromatography (GPC) were $Mn=15\times10^3$ g/mol, and $Mw=30\times10^3$ g/mol.

Example 4: Mechanical Test (GB/T 528-2009)

Test Condition:

Instrument: Instron 5567 Electric Universal Testing Machine (Instron, America); Gauge length: 50 mm; Crosshead speed: 5 mm min$^{-1}$. The specimens of 35 mm×2 mm×0.5 mm were used for this evaluation.

The data was taken from an average of at least five specimens for accuracy.

Result:

The mechanical properties of polyurethane include follows:

In Example 2, ultimate elongation of polyurethane is 500%; Young's modulus is 380 MPa; and ultimate tensile strength is 33 MPa.

In Example 3, ultimate elongation of polyurethane is 70%; Young's modulus is 25 MPa; and ultimate tensile strength is 10 MPa.

APPLICABILITY

In this invention, the time for synthesizing the polyolefin polyurethane under microwave radiation is no more than 5 h, while the reaction time of the traditional heating manner is around 10 h. The microwave radiation greatly shortens the reaction time, and lowers energy consumption, providing a high-efficient and environment friendly route for synthesizing the polyolefin polyurethane. The industrial applicability covers almost all potential use of the polyolefin polyurethane, especially for medical devices, coatings, fibers, adhesives or foam materials.

The invention claimed is:

1. A segmented thermoplastic elastomer made of a polyurethane, polyurea, or polyurethane-urea, the segmented thermoplastic elastomer consisting of:
soft segments and hard segments, wherein
the soft segments are made of a mixture consisting of polyolefin diols, polyolefin diamine, or a combination thereof, the polyolefin diols or polyolefin diamine having 1 to 1000 carbon atoms in the main chain, wherein each carbon atom in the main chain may have 0 to 2 side chains and each side chain may have 0 to 30 carbon atoms,
the hard segment is made of a diisocyanate and a chain extender selected from the group consisting of ethylene glycol, 1,3-propylenediol, 1,4-butanediol, 1,4-hexanediol, 1,4-cyclohexanediol, 1,6-hexanediol, 1,8-octanediol, 1,9-nonanediol, 1,10-decanediol, ethylenediamine, propylenediamine, butylenediamine, hexanediamine, cyclohexanediamine, and mixtures thereof,
the hard segments make up 10-60% of the elastomer and the soft segments make up the rest,
the number-average molecular weight of the elastomer is $5 \times 10^3$-$1000 \times 10^3$ g/mol; the ultimate elongation of the elastomer is 200-1000%; the Young's modulus is 10 to 3,000 MPa; and the ultimate tensile strength is 10-100 MPa,
wherein the elastomer is made by exposing a polymerization mixture prepared from the polyolefin diols or polyolefin diamine, the diisocyanate, and the chain extender to microwave radiation.

2. The elastomer according to claim 1, wherein the number-average molecular weight is $10 \times 10^3$-$300 \times 10^3$ g/mol; the ultimate elongation is 200-700%; and the Young's modulus is 10 to 2,000 MPa.

3. The elastomer according to claim 1, wherein the soft segment is formed from polybutadiene diol, polyisoprene diol, polybutylene diol, polyethylene diol, polypropylene diol, poly(ethylene-propylene) copolymer diol, polyisobutylene diol, branched polyethylene diol, polybutylene diamine, polyethylene diamine, polypropylene diamine, poly(ethylene-propylene) copolymer diamine, polyisobutylene diamine, branched polyethylene diamine, or a mixture thereof.

4. The elastomer of claim 1, wherein the diisocyanate is selected from toluene-2,4-diisocyanate, its isomer or a mixture thereof 4,4'-diphenylmethane diisocyanate, hexamethylene diisocyanate, isophorone diisocyanate, 4,4'-dicyclohexylmethane diisocyanate, methylene bis(cyclohexyl) diisocyanate, trans-cyclohexane, 1,4-diisocyante, p-phenyl diisocyanate, lysine diisocyanate, p-phenyl dimethylene diisocyanate, 1,5-cyclopentane diisocyanate, p-tetramethyl ditoluene diisocyanate, m-tetramethyl ditoluene diisocyanate, and mixtures thereof.

5. The elastomer according to claim 3, wherein the soft segment is hydrogenated polybutadiene diol.

6. The elastomer according to claim 3, wherein the soft segment is hydrogenated polyisoprene diol.

7. A method for preparing the elastomer of claim 1, comprising:
(i) preparing diols that have unsaturated bonds followed by hydrogenating the diols to obtain hydrogenated diols, wherein the diols have 1 to 1000 carbon atoms in the main chain, wherein each carbon atom in the main chain has 0 to 2 side chains, and each side chain has 0 to 30 atoms, the side chain is alkyl or cycloalkyl;
(ii) conducting pre-polymerization of the hydrogenated diols with a diisocyanate and a polymerization catalyst by using microwave radiation, to obtain a polyurethane prepolymer; and
(iii) adding a chain extender into the polyurethane prepolymer, and continuing polymerization by using microwave radiation, to obtain the polyurethane.

8. The method according to 7, wherein step (i) comprises adding the diols and a noble metal hydrogenating catalyst into a hydrogenating reactor to hydrogenate the diols.

9. The method according to claim 8, wherein hydrogenation is conducted at a reaction temperature of 0-200 °C., a reaction pressure of 0.1-100 MPa, and for a reaction time of 1-24 h; and the noble metal hydrogenating catalyst is a Pt group metal.

10. The method according to claim 7, wherein in step (ii), the diisocyanate is selected from toluene-2, 4-diisocyanate, its isomer or a mixture thereof; 4, 4'-diphenylmethane diisocyanate, hexamethylene diisocyanate, isophorone diisocyanate, 4,4,'-dicyclohexylmethane diisocyanate, methylene bis(cyclohexyl) diisocyanate, trans-cyclohexane, 1,4-diisocyanate, p-phenyl diisocyanate, lysine diisocyanate, p-phenyl dimethylene diisocyanate, 1,5-cyclopentane diisocyanate, p-tetramethyl ditoluene diisocyanate, m-tetramethyl ditoluene diisocyanate, and mixtures thereof;
the polymerization catalyst is selected from triethylene diamine, dibutyldilaurate tin, stannous octoate, and mixtures thereof; and
the pre-polymerization temperature is 50-200 °C., and the pre-polymerization time is 1-5 h; and the microwave radiation power is adjusted such that the reaction temperature is maintained within the intended range.

11. The method according to claim 10, wherein pre-polymerization temperature is from 65 to 95 °C.

12. The method according to claim 7, wherein in step (iii), the chain extender is selected from ethylene glycol, 1,3-propylenediol, 1,4-butanediol, 1,4-hexandiol, 1,4- cyclohexanediol, 1,6-henxanediol, 1,8-octanediol, 1,9-nondadiol, 1,10-decanediol, ethylenediamine, propylenediamine, butylenediamine, hexanediamine, cyclohexanediamine, and mixture thereof; and
the polymerization temperature is 50-250 °C., and the polymerization time is 1-5 h; and microwave radiation power is adjusted such that reaction mixture temperature can be maintained within the polymerization temperature range.

13. The method according to claim 11, wherein pre-polymerization temperature is from 65 to 95 °C.

14. The method according to claim 7, wherein the steps (i)-(iii) are conducted in the presence of a solvent, wherein the solvent is selected from toluene, xylene, tetrahydrofuran, trichloromethane, N,N-dimethyl formamid, ethyl acetate, N,N-dimethylacetamide, dimethyl sulfoxide and mixtures thereof.

15. A method for preparing the elastomer of claim 1, the method comprising:
(i) preparing diols and/or diamines that have unsaturated bonds followed by hydrogenating the diols and/or diamines to obtain hydrogenated diols and/or diamines, wherein the diols and/or diamines have 1 to 1000 carbon atoms in the main chain, wherein each carbon atom in the main chain has 0 to 2 side chains, and each side chain has 0 to 30 atoms, wherein the side chain is alkyl or cycloalkyl;

(ii) conducting pre-polymerization of the hydrogenated diols, diamines, or mixture thereof obtained in step(i) with a diisocyanate and a polymerization catalyst by using microwave radiation, to obtain a prepolymer; and (iii) adding a chain extender into the prepolymer, and continuing polymerization by using microwave radiation, to obtain the elastomer.

16. A method for preparing the elastomer of claim 1, the method comprising:

(i) preparing diols or diamines that have unsaturated bonds;

(ii) conducting pre-polymerization of the diols or diamines obtained in step (i) with a diisocyanate and a polymerization catalyst by using microwave radiation, to obtain a polyurethane or polyurea prepolymer; and (iii) adding a chain extender into the polyurethane or polyurea prepolymer, and continuing polymerization by using microwave radiation, to obtain the polyurethane or polyurea; and (iv) hydrogenating the polyurethane or polyurea in presence of catalysts.

17. A medical device comprising the segmented thermoplastic elastomer of claim 1.

* * * * *